United States Patent
Duo et al.

(10) Patent No.: US 12,056,237 B2
(45) Date of Patent: Aug. 6, 2024

(54) ANALYSIS OF HISTORICAL NETWORK TRAFFIC TO IDENTIFY NETWORK VULNERABILITIES

(71) Applicant: SONICWALL INC., Milpitas, CA (US)

(72) Inventors: Zhuangzhi Duo, Fremont, CA (US); Atul Dhablania, San Jose, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

(21) Appl. No.: 18/215,943

(22) Filed: Jun. 29, 2023

(65) Prior Publication Data

US 2024/0045954 A1    Feb. 8, 2024

Related U.S. Application Data

(63) Continuation of application No. 17/111,414, filed on Dec. 3, 2020, now Pat. No. 11,693,961, which is a
(Continued)

(51) Int. Cl.
*G06F 21/56* (2013.01)
*H04L 9/40* (2022.01)

(52) U.S. Cl.
CPC .......... *G06F 21/561* (2013.01); *G06F 21/564* (2013.01); *G06F 21/566* (2013.01); *H04L 63/145* (2013.01)

(58) Field of Classification Search
CPC .... G06F 21/561; G06F 21/564; G06F 21/566; G06F 21/552; H04L 63/145;
(Continued)

(56) References Cited

U.S. PATENT DOCUMENTS

| | | | | |
|---|---|---|---|---|
| 5,948,104 A | * | 9/1999 | Gluck | G06F 21/564 |
| | | | | 713/188 |
| 7,743,419 B1 | * | 6/2010 | Mashevsky | H04L 63/145 |
| | | | | 713/188 |

(Continued)

OTHER PUBLICATIONS

U.S. Appl. No. 17/111,398 Final Office Action mailed Mar. 20, 2023.
(Continued)

*Primary Examiner* — Ali S Abyaneh
(74) *Attorney, Agent, or Firm* — Polsinelli LLP

(57) ABSTRACT

Methods and apparatus consistent with the present disclosure may be used after a computer network has been successfully attacked by new malicious program code. Such methods may include collecting data from computers that have been affected by the new malicious program code and this data may be used to identify a type of damage performed by the new malicious code. The collected data may also include a copy of the new malicious program code. Methods consistent with the present disclosure may also include allowing the new malicious program code to execute at an isolated computer while actions and instructions that cause the damage are identified. Signatures may be generated from the identified instructions after which the signatures or data that describes the damaging actions are provided to computing resources such that those resources can detect the new malware program code.

18 Claims, 9 Drawing Sheets

Related U.S. Application Data continuation-in-part of application No. 16/863,933, filed on Apr. 30, 2020, now Pat. No. 11,388,176.

(60) Provisional application No. 62/943,130, filed on Dec. 3, 2019, provisional application No. 62/943,122, filed on Dec. 3, 2019.

(58) Field of Classification Search
CPC ............... H04L 43/045; H04L 63/1416; H04L 63/1433; H04L 43/028; H04L 43/062
See application file for complete search history.

(56) References Cited

U.S. PATENT DOCUMENTS

| | | | |
|---|---|---|---|
| 7,823,205 B1 | 10/2010 | Isenberg et al. | |
| 8,875,292 B1* | 10/2014 | Bogorad | H04L 63/1416 726/24 |
| 8,904,535 B2 | 12/2014 | Liu et al. | |
| 8,990,723 B1 | 3/2015 | Lymer et al. | |
| 9,009,827 B1* | 4/2015 | Albertson | H04L 63/1441 726/22 |
| 10,104,101 B1 | 10/2018 | Thakar et al. | |
| 10,250,623 B1 | 4/2019 | Patton et al. | |
| 10,607,011 B1* | 3/2020 | Orhan | G06F 21/566 |
| 10,701,086 B1* | 6/2020 | Mushtaq | H04L 47/2483 |
| 10,805,340 B1 | 10/2020 | Goradia | |
| 10,893,059 B1 | 1/2021 | Aziz et al. | |
| 11,003,773 B1* | 5/2021 | Fang | H04L 63/0263 |
| 11,102,223 B2 | 8/2021 | Kraemer et al. | |
| 11,388,176 B2 | 7/2022 | Conner et al. | |
| 11,693,961 B2 | 7/2023 | Duo et al. | |
| 2006/0031933 A1 | 2/2006 | Costa et al. | |
| 2007/0016955 A1 | 1/2007 | Goldberg et al. | |
| 2009/0070873 A1 | 3/2009 | McAfee et al. | |
| 2009/0083852 A1 | 3/2009 | Kuo et al. | |
| 2010/0115620 A1 | 5/2010 | Alme | |
| 2012/0260343 A1* | 10/2012 | Sun | G06F 21/564 726/24 |
| 2016/0048681 A1 | 2/2016 | Fang | |
| 2016/0232358 A1 | 8/2016 | Grieco et al. | |
| 2016/0308905 A1* | 10/2016 | Stiekes | H04L 63/08 |
| 2017/0019415 A1* | 1/2017 | Takano | G06F 21/56 |
| 2017/0083703 A1 | 3/2017 | Abbasi et al. | |
| 2018/0124098 A1 | 5/2018 | Carver et al. | |
| 2018/0139235 A1* | 5/2018 | Desai | H04L 63/1483 |
| 2018/0144139 A1 | 5/2018 | Cheng et al. | |
| 2018/0191771 A1* | 7/2018 | Newman | H04L 63/20 |
| 2018/0288087 A1* | 10/2018 | Hittel | G06F 21/577 |
| 2019/0007436 A1 | 1/2019 | Dods | |
| 2019/0081970 A1 | 3/2019 | Teramoto | |
| 2019/0132358 A1 | 5/2019 | Divalentin et al. | |
| 2019/0297097 A1 | 9/2019 | Gong et al. | |
| 2020/0153863 A1 | 5/2020 | Wiener et al. | |
| 2021/0165879 A1 | 6/2021 | Duo et al. | |
| 2021/0168157 A1 | 6/2021 | Conner et al. | |
| 2021/0194915 A1 | 6/2021 | Duo et al. | |
| 2023/0007013 A1 | 1/2023 | Conner et al. | |

OTHER PUBLICATIONS

U.S. Appl. No. 17/111,398 Office Action mailed Jun. 24, 2022.
U.S. Appl. No. 17/111,414 Office Action mailed Sep. 15, 2022.
U.S. Appl. No. 17/111,398 Final Office Action mailed Aug. 16, 2023.
U.S. Appl. No. 17/111,398 Final Office Action mailed Mar. 7, 2024.

\* cited by examiner

ANALYSIS OF HISTORICAL NETWORK TRAFFIC TO IDENTIFY NETWORK VULNERABILITIES

CROSS-REFERENCE TO RELATED APPLICATIONS

The present application is a continuation in part and claims priority benefit of U.S. patent application Ser. No. 17/111,414 filed Dec. 3, 2020, now U.S. Pat. No. 11,693,961, which is a continuation and claims priority benefit of U.S. patent application Ser. No. 16/863,933, filed Apr. 30, 2020, now U.S. Pat. No. 11,388,176, which claims priority benefit of U.S. provisional patent application 62/943,122 filed Dec. 3, 2019 and U.S. provisional patent application No. 62/943,130 filed Dec. 3, 2019, the disclosures of which are incorporated herein by reference.

BACKGROUND OF THE INVENTION

Field of Invention

The present disclosure generally relates to performing analysis on sets of computer data that may include new types or forms of computer malware. More specifically, the present disclosure is directed to characterizing new sets of malware program code such that assets that protect computers and computer networks can be updated after new malware threats are detected and characterized.

Description of the Related Art

Computer systems and computer networks today are vulnerable and may be exploited by different types of software threats. Such software threats are commonly referred to as malware. Malware may come in any forms or types that may be classified as ransomware, viruses, computer worms, Trojans, adware, and spyware. Malware includes all software written with executable code directed to secretly manipulating, altering, disrupting, and/or damaging computer systems or computer data. Malware attacks may target computers belonging to individuals or organizations for social, political, economic, and/or monetization purposes. Malware is typically distributed by parties with nefarious intent. Malware is commonly used steal or destroy computer data or to snoop or spy on the actions of a user when the user operates a computer. Malware, such as a computer virus, may also self-replicate and spread to other computers. Malware may also be spyware (or Trojans) designed to steal personal or financial information, or may be ransomware that attempts to blackmail computer users by denying access to their own data unless or until a fee is paid. Malware can reside in sets of data packets transferred between computers or can reside in a data storage device in the form of a file or other data, for example.

As mentioned above, viruses are software programs that can often replicate themselves as these viruses attempt and infect computers, disrupt the operations of computers, or destroy computer data. Viruses can also be used to gain administrative control of a computer to force computers to download and execute other malicious programs, spread infection to other computers, or destroy sensitive user data. Trojans are often designed to extract sensitive data from a computer or computer network. Trojans may take control of an infected system and open a back door for an attacker to access later. Trojans are often used the in creation of botnets. Spyware may be used to infect web browsers, sometimes making them nearly inoperable. Spyware may sometimes be disguised as a legitimate software application that appears to provide a benefit while secretly recording behavior and usage patterns. Furthermore, newly developed malware is increasingly difficult to identify. Frequently, until a particular sort of malware has been identified and characterized, conventional techniques that identify whether a communication includes malware can miss detecting the presence of that malware in the communication. This may occur when information in one or more received data packets is hidden or when the malware is not identifiable by a signature associated with the information in the received data packets.

Presently, thousands of new malware samples are discovered all over the internet each day. According to the popular malware detection website Virustotal.com, an average number of unique malware samples identified daily are above 800,000. This huge number of malware samples traversing the internet poses a significant challenge for detection using known pattern matching methods employed by traditional anti-malware solutions. Significantly, almost all the new malware samples observed each day are actually repackaged versions of known malware. Individuals that generate malware today often obfuscate the presence of malicious code by packing it within other executable code or by compressing it. In certain instances, this malicious code may be hidden using binary packing software or a form of software that is referred to as "protector" software. This packing or "protecting" function may reorganize or manipulate a piece of original malware code into a structure that cannot be detected using conventional packet scanning. As such, repackaged versions of old malware can successfully evade detection when conventional scanning techniques such as deep packet inspection (DPI) are used. DPI relies on pattern matching data included in a set of data packets with attributes associated with or signatures generated from previously identified malicious code.

When a repackaged malware is received, malicious instructions may be executed by a processor at a computing device. In certain instances malware reveals (unpacks) its internal malicious code and associated data in process memory after which the malicious code may then executed by a processor at the computing device. The difficulty in detecting repackaged malware is compounded by the fact that memory extraction of code and data does not generate any operating system events, such as a system call or call-backs which can be intercepted externally. Hence, malicious code can silently be extracted, executed and removed from memory.

Since malware can and is used by those to steal or destroy computer data and since repackaged malware can avoid detection when conventional techniques are used, what are needed are detection methods that do not depend on the content of a set of computer data. Because of the threats posed by malware today, companies like Sonic Wall Inc. collect data from various sources when tracking what forms of malware are impacting computers in different regions of the World. Knowing what types of malware that are currently being deployed in particular locations can provide a way to help prevent the spread of that malware to computers in different regions of the World.

While data are currently being collected regarding locations where certain particular types of malware are currently infecting computers, organizing and reviewing this data provides those chartered with the responsibility of preventing the spread of malware with logistical difficulties. Simply put, the volume of data generated each day regarding the distribution of malware throughout the World is so large (hundreds of thousands to millions of instances) that identifying the extent of a particular threat is very difficult. Furthermore, the tracking and analysis of vast numbers of different types of malware make the tracking on malware by persons impossible. What are needed are new methods and apparatus that collect data regarding malware threats and new ways of organizing and presenting malware threat data that quantifies an amount of damage that a piece of malware could have wreaked on computers if that malware were not prevented from spreading. Identifying the extent of the spread of malware may also help identify how to improve programs or systems that identify, block, isolate, or destroy malware. Because of this, new methods and systems that process threat data such that this threat data can be easily evaluated are also required. What are also needed are methods directed to analyzing malware after that malware has damaged a computer system or network such that infrastructure that protects computers may be enhanced over time.

SUMMARY OF THE CLAIMED INVENTION

The presently claimed invention relates to a method, a non-transitory computer readable storage medium, and a system that perform functions consistent analyzing computer data for the presence of malware. A method consistent with the present disclosure may classify instructions included in a received set of computer data as a new set of malware program code, this classification may be based on an identification that an action performed by the execution of the instructions included in the set of computer data is a malicious action. The presently claimed method may also identify a set of requirements for detecting the new set of malware program code based on the identified malicious action, generate data associated with the requirements, and send the generated data to one or more assets such that those one or more assets can detect the new set of program code.

When the presently claimed invention is implemented as a non-transitory computer readable storage medium, a processor executing instructions out of a memory may classify instructions included in a received set of computer data as a new set of malware program code. This classification may be based on an identification that an action performed by the execution of the instructions included in the set of computer data is a malicious action. Here again, the method may also identify a set of requirements for detecting the new set of malware program code based on the identified malicious action, generate data associated with the requirements, and send the generated data to one or more assets such that those one or more assets can detect the new set of program code.

A system consistent with the present disclosure may include an analysis computer that performs an analysis on a received set of computer data. This analysis computer may classify instructions included in a received set of computer data as a new set of malware program code. Hera again, this classification may be based on an identification that an action performed by the execution of the instructions included in the set of computer data is a malicious action. This analysis computer may also identify a set of requirements for detecting the new set of malware program code based on the identified malicious action, generate data associated with the requirements, and send the generated data to one or more assets such that those one or more assets can detect the new set of program code.

DETAILED DESCRIPTION

Figure 1:
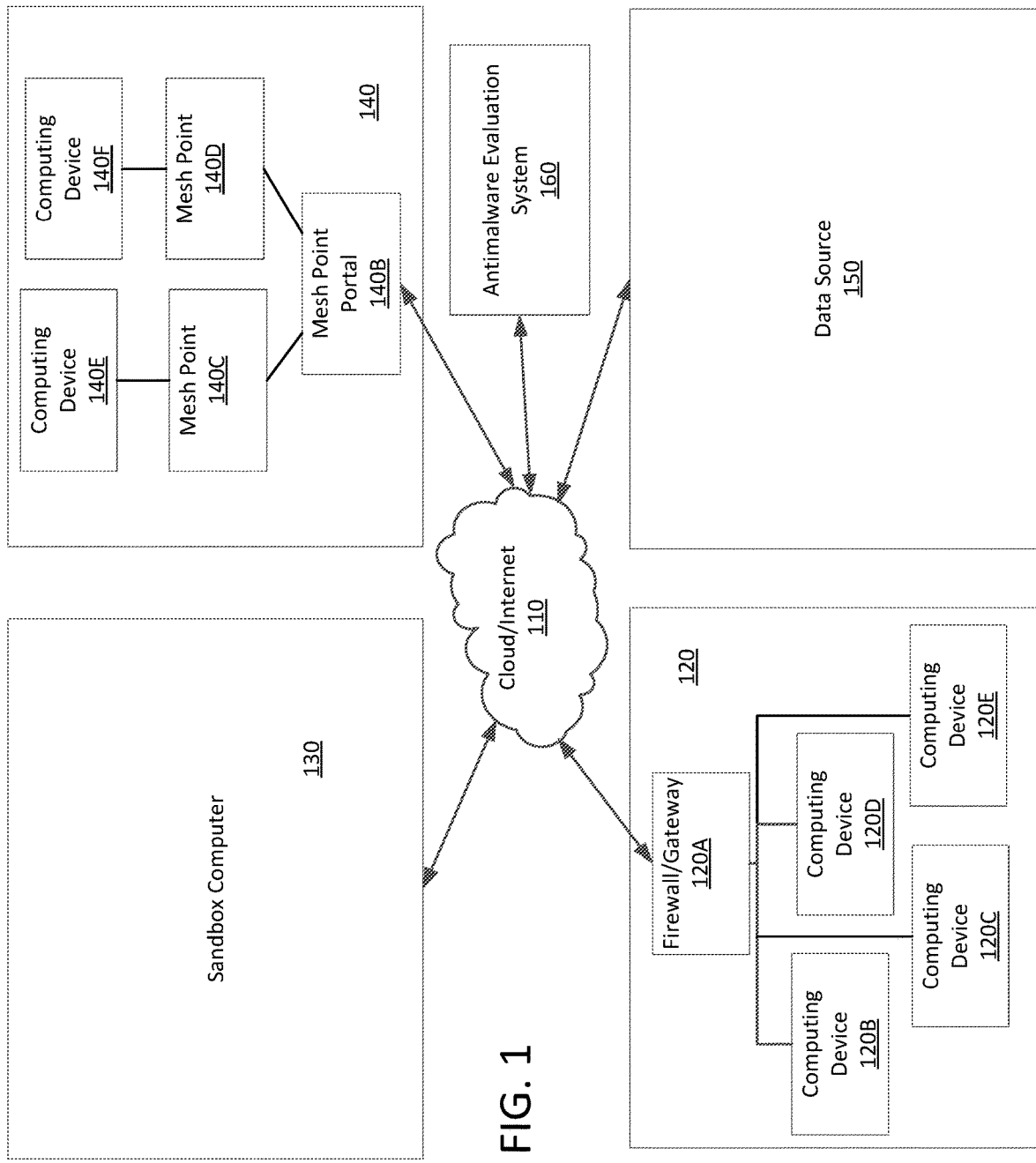
FIG. 1 illustrates a system that may be used to identify and characterize new types of malware.

The present disclosure relates to methods and apparatus that collect, organize, and analyze data regarding malware threats such that the spread of malware can be quantified and damage associated with that malware can be prevented. The present disclosure is also directed to preventing the spread of malware before that malware can steal data or damage computers and to identifying an amount of damage that malware could have wreaked if it were allowed to spread though a computer network. Methods consistent with the present disclosure may be directed to optimizing tests performed at different levels of a multi-level threat detection and prevention system. As such, methods consistent with the present disclosure may collect data from various sources when organizing threat data for display on a display. Such threat data may be collected various sources that may include computers that run antimalware software, firewalls or gateways that reside at a boundary between a private computer network and a public computer network, wireless mesh nodes that perform an antimalware function, or from isolated computers that allow received software to operate as the behavior of that software is monitored to see if that software performs a malicious or suspicious act (e.g. a "sandbox" computer). As such, sources of malware data may be identified using apparatus or software that evaluates malware test data received from various sources when quantifying the spread of malware. Since methods consistent with the present disclosure can graphically illustrate the spread of large amounts of malware being distributed throughout the World instantaneously (by depicting hundreds, thousands, to millions of malware intrusions per second), methods and apparatus consistent with the present disclosure can protect computers in ways that were not previously possible.

Methods and apparatus consistent with the present disclosure may receive data that identifies a type of malware, locations where that type of malware are currently being detected, and may identify how fast particular types of malware are spreading. Once malware test data is received, it may be organized by malware type and regions where that malware is being distributed in real-time or in near-real-time. The collected data may also be evaluated to identify a number of incidents of detection of a particular type of malware as that malware spreads to different locations. In certain instances, the operation of one or more different sources of malware data may be disabled (turned off) such that a measure of effectiveness of a particular antimalware apparatus or software can be identified.

Methods and apparatus consistent with the present disclosure may be used after a computer network has been successfully attacked by new malicious program code. Such methods may include collecting data from computers that have been affected by the new malicious program code and this data may be used to identify a type of damage performed by the new malicious code. The collected data may also include a copy of the new malicious program code. Methods consistent with the present disclosure may also include allowing the new malicious program code to execute at an isolated computer while actions and instructions that cause the damage are identified. Signatures may be generated from the identified instructions after which the signatures or data that describes the damaging actions are provided to computing resources such that those resources can detect the new malware program code.

FIG. 1 illustrates a system that may be used to receive and organize malware test data when locations where particular types of malware are identified and blocked. FIG. 1 includes cloud or Internet 110, private network 120, sandbox computer 130, wireless mesh network 140, data source 150, and anti-malware evaluation system 160. Private network 120 includes firewall/gateway 120A and computing devices 120B-120E (120B, 120B, 120C, 120D, & 120E). Wireless mesh network 140 may include mesh point portal 140B, mesh points 140C & 140D, and computing devices 140E & 140F.

When computing devices 120B-120E of private network 120 or computing devices 140E-140F attempt to access data residing at or originating from data source 150 via cloud or Internet 110, the requested data may be analyzed for threats. Data source 150 is representative of any number of sources of data such as a web server, email server, file server, cloud storage or the like. As varied as data source 150 may be, the data retrieved from that source is equally diverse. In that regard, data from data source 150 may include webpages, data in webpages, email, video, audio, and data files, file attachments such as word documents or PDFs, or servers or gateways allowing access to other networks and credentials that might be exchanged with respect to accessing the same.

Data retrieved from or delivered by data source 150 may encompass one or more forms of malware. As such, inbound data from data source 150 or a proxy thereof may be tested at firewall/gateway 120A utilizing one or more anti-malware apparatus or software implementations. Similar testing may occur at the likes of wireless mesh portal 140B or at computing devices 120B-120E, one or more of which may be configured with or otherwise have access to anti-malware apparatus or software implementations, including sandbox computer 130 or anti-malware evaluation system 160.

In certain instances, data from a data request may be sent to sandbox computer 130 that may perform a series of runtime tests on received data. Such a request may be passed to sandbox computer by firewall/gateway 120A, mesh portal 140B, or one or more of computing devices 120B-E or meshed computing devices 140E-F. Sandbox computer 130 may retrieve the requested data when preparing to perform the runtime tests from a quarantine data retention source (not shown) or through a further request to data source 150. Sandbox computer 130 may examine runtime tests without the threat of infecting a larger network (like network 120) and then pass the results of said analyses to an anti-malware evaluation system 160 for use in the future or to otherwise aid in inoculating a network from inbound malware traffic.

Data received from data source 150 may also be tested by firewall/gateway 120A or may be tested by computers at wireless mesh network 140. In certain instances, individual computing devices that generate data requests may also perform tests on received data. As such, computing devices 120B-120E and 140E-140F may test received data when looking for malware.

Data from tests performed by firewall/gateway 120A, by sandbox computer 130, by computers at wireless mesh network 140, or by requesting computing devices 120B-120E and 140E-140F may be passed to or operate in conjunction with anti-malware evaluation system 160. This data may be passed to anti-malware evaluation system 160 in real time or in near-real time from each respective device that performs anti-malware tests. The test data passed to anti-malware evaluation system 160 may include a test result, information that identifies data source 150, or information that identifies a location where a data request originated some or all of which may have been generated in conjunction or as a result of runtime testing at sandbox computer 130.

Evaluation system 160 may then identify a network location affected by the malware, identify malware types affecting particular parts of a network, identify a test type or test location, and/or identify a time when a particular type of malware was detected. Analysis performed at anti-malware evaluation system 160 may then analyze data received throughout a region of the World when identifying types of malware, specific tests that detected that malware, locations where requests for the malware originated, and sources of malware affecting that World region. Anti-malware evaluation system 160 may then generate a visualization that graphically illustrates dynamic conditions as different types of malware are detected around the World.

The terms "access point" or "wireless access point" in the present disclosure refer to a device that may be wirelessly communicatively coupled to a computer directly with or without wireless communications passing through another wireless device. The terms "access point" or "wireless access point" may refer to either a mesh portal or mesh point. The term "mesh portal" may relate to a wireless device that performs functions that a mesh point need not perform. Both mesh portals and mesh points may perform functions consistent with a wireless access point because both mesh portals and mesh points may act as a wireless access point that directly wirelessly communicates with a computer such as computing device 140E of FIG. 1.

The terms "mesh node" in the present disclosure may be used to refer to either a mesh portal or a mesh point that uses wireless communications to transmit and receive wireless computer network messages and data. A mesh portal may be configured to transmit and receive data network communication traffic between two different types of computer networks, for example, between a network that communicates over wires and a network that uses wireless 802.11 signals. As such, mesh point portal 140B of FIG. 1 may communicate via cloud/Internet 110 using Ethernet connections and may communicate with mesh points 140C-D using 802.11 compliant signals. Alternatively or additionally, a mesh portal (e.g. 140B of FIG. 1) may transmit and receive data network communication traffic between a cellular network and an 802.11 network. While mesh portals include different functionality as compared to a mesh point, certain mesh points may be configured to assume the role of a mesh portal.

Typically the terms "firewall" or "gateway" in the present disclosure (e.g. firewall/gateway 120A of FIG. 1) may refer to computing devices that communicate over wired network connections. In certain instances, however, a mesh node may include functionality consistent with a firewall or gateway. In certain instances, functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

Figure 2:
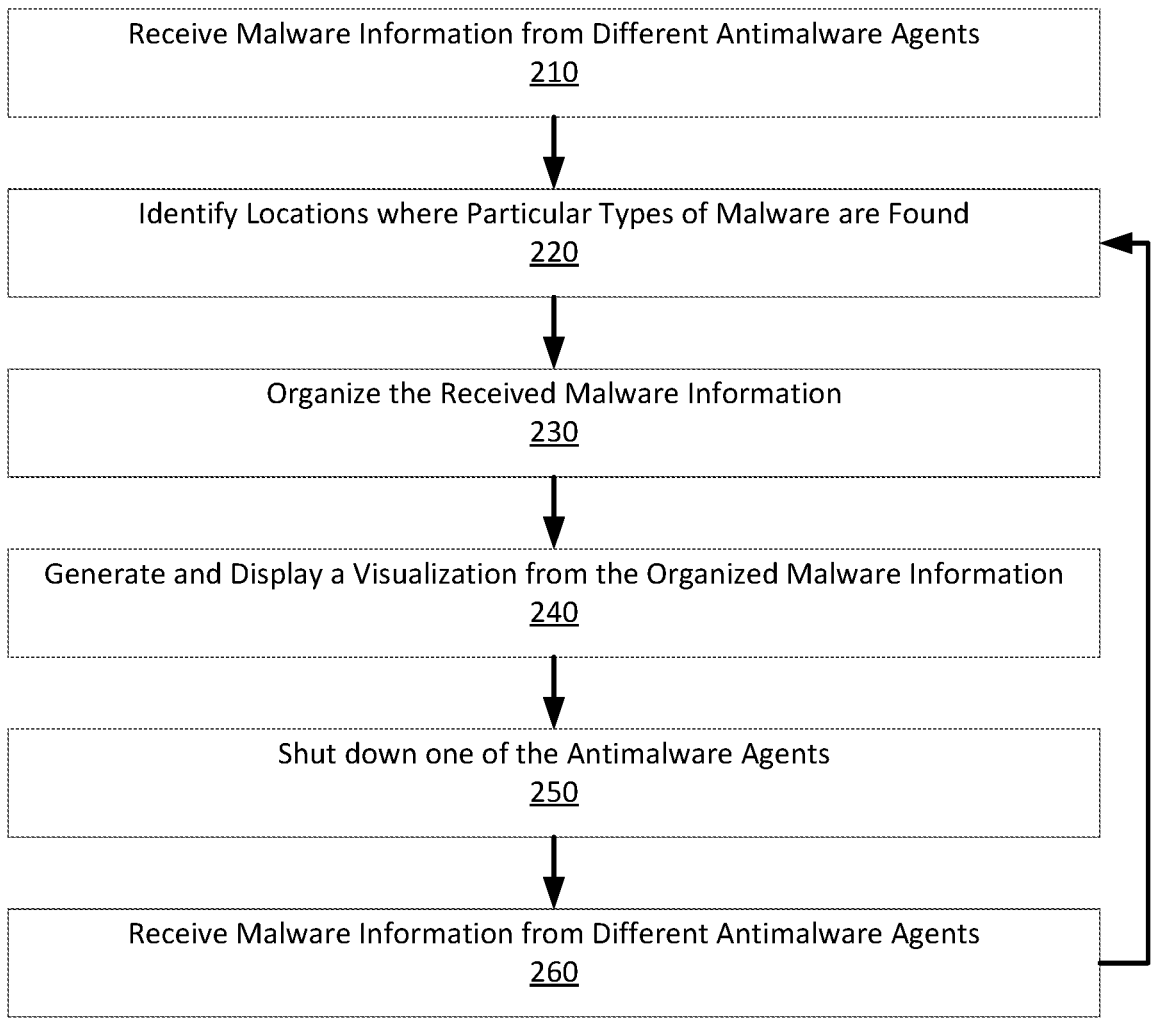
FIG. 2 illustrates an exemplary method consistent with the present disclosure that receives, organizes, and presents information received from different antimalware agents or test computers.

FIG. 2 illustrates an exemplary method consistent with the present disclosure that receives, organizes, and presents information received from different anti-malware agents or test computers. FIG. 2 includes step 210 where information relating to malware may be received, for example, by anti-malware evaluation system 150 of FIG. 1. Step 220 of FIG. 2 may then identify locations where this malware was found. Alternatively or additionally, step 220 of FIG. 2 may identify a location where a data request originated, a network location affected by the malware, a malware type, a test type or test location, and/or a time stamp that identifies a time when a test detected malware. Next in step 230 the received information may be organized and a visualization of that data may be generated and displayed in step 240. Then, in optional step 250 of FIG. 2 a particular type of malware detection agent may be shut down (turned off) and additional malware test data/information may be received in step 260 reflecting the results of said adjustment. After step 260 program flow may move back to step 220 of FIG. 2, after which that information may be organized and used to generate additional visualizations.

The steps of FIG. 2 may be executed iteratively when the performance of different discrete anti-malware agents are evaluated. As such, step 250 of FIG. 2 may turn on an anti-malware agent that was previously shut down and then shut down a different anti-malware agent. The turning on or off of certain specific tests or test layers and collecting of test data that correspond to those changing conditions may be used to help identify strengths and weakness associated with different specific computing devices that perform anti-malware tests.

Figure 3:
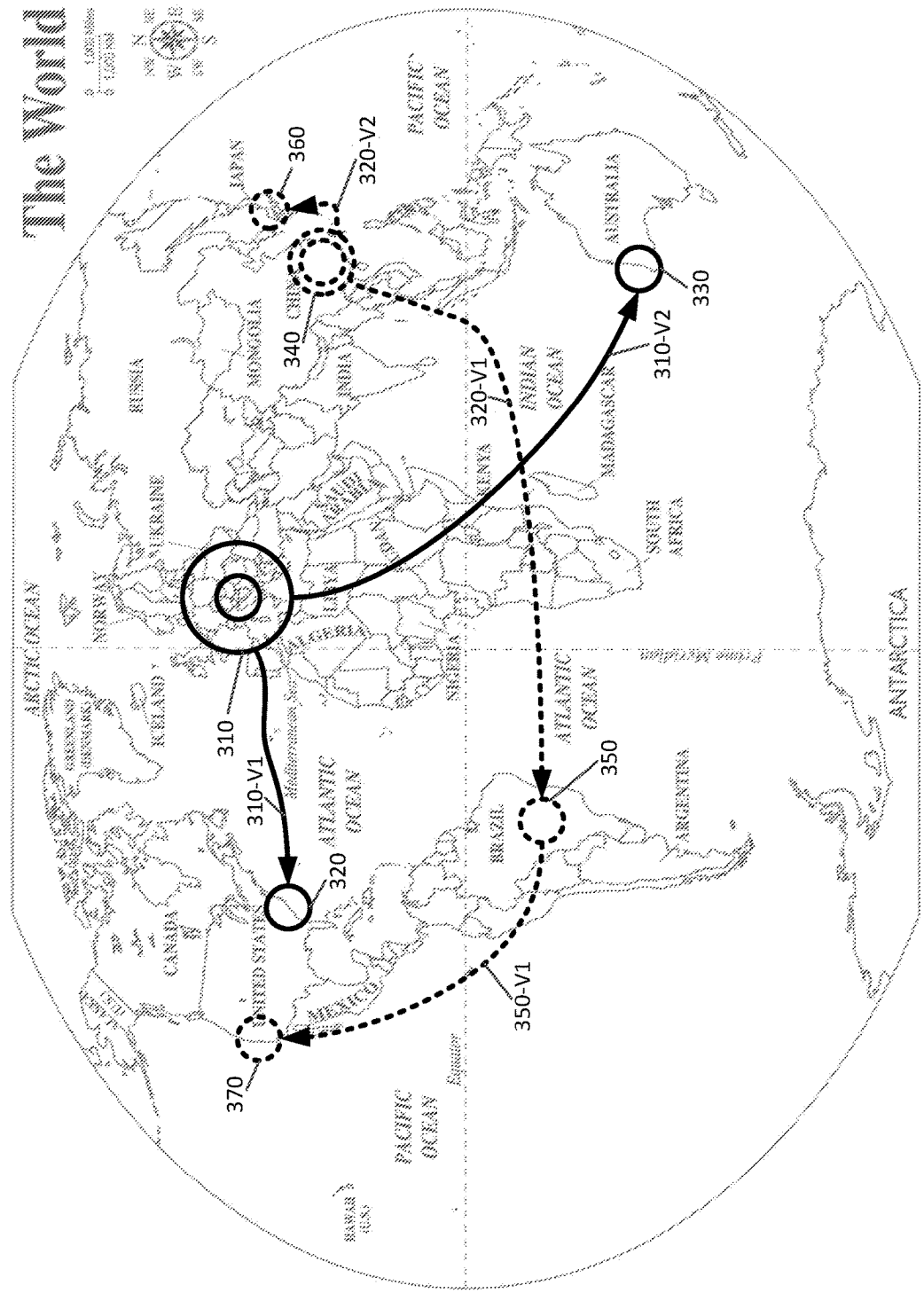
FIG. 3 illustrates a World map that may be used to identify and map locations where malware has been detected.

FIG. 3 illustrates a World map that may be used to identify and map locations where malware has been detected. FIG. 3 includes circles 310 that include a smaller circle and a larger circle. The size of a circle may correspond to an area where a particular type of malware has been detected. The smaller circle of circles 310 may identify a region where a particular virus has been identified and as that virus propagates through the internet, the larger circle of circles 310 may indicate that the virus has spread from central Europe into Western Europe and into Ukraine, for example. Characteristics of malware circles 310 (e.g. a line weight of circles 310, a color of circles 310, and the solid line of circles 310) may correspond to a type of malware or to a type of anti-malware agent that discovered malware or the scale or infectiousness thereof.

Item 310-V1 is a malware vector that indicates that the malware associated with circles 310 has moved to the Eastern United States as indicated by circle 320. Similarly, malware vector 310-V2 indicates that the malware associated with circles 310 has moved to Australia as indicated by circle 330 of FIG. 3. Visualizations consistent with the present disclosure may be used to identify locations where particular types of malware have been detected, may identify the extent of the spread of a particular type of malware in a region (e.g. Europe), and may include vectors that identify malware jumping from one region to another (e.g. from Europe to the Eastern U.S.A.). Various forms of data may be reflected by the weight, color, or pattern of a vector line. That data be access either through color coding, hovering over a particular vector, or clicking on the same. That data related to vectors (as well as circles 310) may be displayed in popup bubbles, pre-existing windows, or other forms of display.

FIG. 3 also illustrates a second type of malware that has been identified in China. This second type of malware may be identified graphically using the dashed circles (340, 350, 360, & 370) and dashed malware vectors (320-V1, 320-V2 & 350-V1) included in FIG. 3. Note that this second type of malware begins to spread in China as indicated by the circles 340 with increasing diameter. This second type of malware then spreads to Brazil via vector 320-V1 and to Japan via vector 320-V2. Note that the spread of this second type of malware to Brazil and to Japan are indicated by circles 350 and 360 respectively. FIG. 3 also illustrates that the second type of malware has spread to the Western U.S.A. via threat vector 350-V1. Note that the spread of this second type of malware to Brazil, to Japan, and to the Western U.S.A. are indicated by circles 350, 360, and 370. Through use of display data, circles, weight lines, color coding, vectors and the like, outbreaks of malware may be identified and contact traced throughout the world. The scale of the map shown in FIG. 3 may likewise be scaled up or down to reflect varying details of information that can range from countries, to states, to municipalities, to wide area networks, to local area networks, and even individual computing devices.

Figure 4:
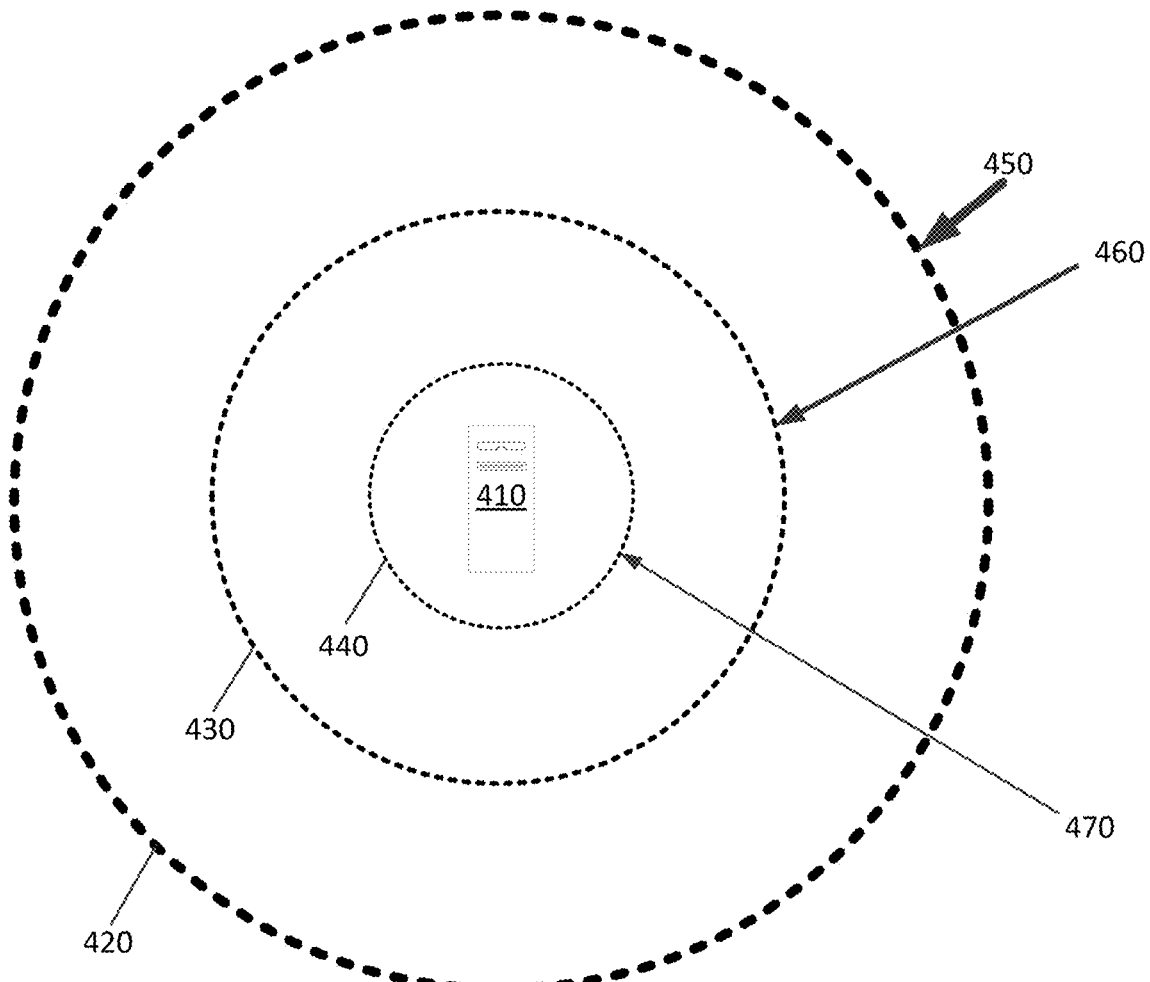
FIG. 4 illustrates a computer or datacenter that is protected from malware by several different layers of protection.

FIG. 4 illustrates a computer or datacenter that is protected from malware by several different layers of protection. These layers of protection that may be provided by anti-malware tools can be graphically displayed vis-à-vis computer or datacenter 410 is protected by an outer layer or shell 420, a middle layer 430, and an inner layer 440 of malware protection. Layers may be representative of not only particular tools, but also portions of network relative computing device or datacenter 410.

Arrowed lines 450, 460, and 470 represent different types of malware that are attempting to attack computer or datacenter 410. Note that each layer or shell of malware protection 420, 430, and 440 and each type of malware threat 450, 460, and 470 are represented by different line weights/widths in FIG. 4. Here again methods consistent with the present disclosure may alternatively use color codes or other forms of visual display instead of line weights/widths to identify different malware protection layers or different types of malware threats.

Note that FIG. 4 illustrates anti-malware layer 420 stopping malware 450 from attacking computer or datacenter 410, illustrates anti-malware layer 430 stopping malware 460 from attacking computer/datacenter 410, and illustrates anti-malware layer 440 stopping malware 470 from attacking computer/datacenter 410. Functions consistent with anti-malware layer 420 may be performed by a computing device at a computer network like firewall/gateway 120A or anti-malware agents operational at wireless mesh network 140 of FIG. 1. Functions that may be performed by anti-malware layer 420 may include content filtering using universal resource locators (URL), deep packet inspection (DPI), botnet filtering, firewall/gateway virus inspection scanning, and intrusion prevention. As such a firewall or gateway device may comprise a first layer of defense, where that firewall/gateway or computer performs a set of tests that may not include executing program code in an isolated secure environment (e.g. a sandbox computer).

One of ordinary skill in the art would understand that looking up a URL or domain associated with a request for data may be a first anti-malware test of a plurality of anti-malware tests. When a request to access data stored at a URL or domain is listed in a blacklist, the access request can be blocked by the firewall/gateway. In certain instances a list of URLs or domains associated with malware or other undesired content may be updated over time.

DPI refers to the scanning of data included in a set of data or data packets for patterns that are known to be associated with malware. Methods consistent with the present disclosure may perform DPI scans on unencrypted data or may perform DPI scans on data transmitted according via a secure socket layer (SSL) or communication session, such DPI scans may be referred to as DPI-SSL scans.

Botnet filtering may be performed by a processor executing instructions that check to see if data is being sent from a protected computer to computing devices outside of a protected network. For example, botnet filters may be used to identify and block outgoing communications that include passwords, credit card numbers, key strokes, or other proprietary or sensitive data.

The presence of a virus at a firewall/gateway may be identified using DPI or may be identified by identifying certain types of suspicious activity. For example, an anti-virus program may identify that as a piece of program code has been replicated or may identify that a piece of program code has been attached to a legitimate document.

Intrusion detection may include identifying that data being sent to computer outside of a protected network does not conform to a set of rules. For example, when a particular operation should send no more than X bytes of data to an external computer, intrusion detection software may identify when such an operation attempts to send more than X bytes of data to the external computer when that operation is performed. Accordingly, operations performed by anti-malware layer 420 may be limited to a set of specific types of operations.

The second layer, item 430 illustrated in FIG. 4 may perform a second set of anti-malware operations/tests and these operations may be performed at computing device that is remote from a particular protected network. Such remote computing devices can perform functions related to more advanced DPI, extended URL/domain name checking, email security, or include functions performed by an isolated computer (e.g. a sandbox computer). In certain instances, anti-malware functions performed at an external computer may overlap with functions performed at a firewall/gateway.

Additionally or alternatively, functions performed by an external computer may be tuned to identify recently identified threats or may identify threats for a first time. For example, a sandbox computer may be used to identify a new malware threat, DPI signatures associated with that new malware threat may be updated and stored at the remote computer, and the operation of DPI scanners at the remote computer may be updated to identify this new malware using DPI signatures. In certain instances, the remote computer may have access to a larger set of malware associated DPI signatures that a set of malware signatures currently stored at a firewall.

Similarly an external computer may be aware of URLs/domains that recently have been assigned a bad reputation at a time when a firewall currently store no data identifying that these URLs/domains have been assigned the bad reputation.

Over time, of course recently identified DPI patterns or URLs/domains may be sent to firewalls such that operations of those firewalls can be enhanced overtime. Suspicious activity can also be identified by computers that are remote to a firewall or secure network.

Such suspicious activity can be performed by an isolated computer (e.g. a sandbox computer) that allows computer data be manipulated or executed by a processor. Suspicious activity identify by a sandbox computer may include identifying that program code has changed state (e.g. from non-executable code to executable code), that may include overwriting certain portions of memory that should not be overwritten under normal circumstances, may include identifying that a certain set of program code is attempting to send data to another computer in violation of a rule, or by identifying that a set of computer data performs a function of self-replication.

Computers external to a computer network may also be used to perform security functions that test email for threats. Such email tests may identify whether an email is hosted on an external server or by a computer inside of a protected network, data sent to or from particular email addresses or domains may be tested. In such instances, tests performed by this external computer may include DPI performed on email or email attachments, URL/domain name checks on attachment or links that are included in email, or may include allowing data included in an email or email attachment to be processed or executed by an isolated sandbox computer. As such, operations performed at layer 430 of FIG. 4 may include any form of malware test desired or that is configured to be performed at the external computer. Such external computers may be computers accessible via the Internet and such external computers may be located in the Cloud.

The third layer, item 440 of FIG. 4 that may include software operational on an endpoint device that tests computer data to see if it includes malware. Endpoint devices include computers, laptops, tablet computers, smartphones, or any computing device that may not always be contained within a secure network. As such, endpoint devices can be personal computers or general purpose computing devices that do not provide services for other computers. Endpoint devices may be computing devices 120B-120E or 140E & 140F of FIG. 1. Endpoints may, thus, be client devices that do not provide the functionally of computer server or firewall/gateway for other client devices. Even though endpoint devices may not provide functionality of a firewall or gateway for other client devices, endpoint devices may be configured with a software firewall that performs tests on computer data received by an endpoint device. Tests performed by such a software firewall may include URL/domain name reputation checking, DPI scanning, antivirus tests, and anti-bot testing.

Since the third layer 440 of testing includes tests that may be performed at an endpoint device, this third layer 440 may also protect computers from malware even when those computers are not contained within a protected network. Functionality that may also be associated with this third layer 440 of protection includes rolling back a software configuration at an endpoint computer. Such a rollback may restore a software configuration at an endpoint computer to a state that is free of malware after that endpoint computer has been compromised by malware. In such instances the restored software configuration may be equivalent to a software configuration at the endpoint device from a point in time before the malware compromised the endpoint computer.

In certain instances, protection layer 440 of FIG. 4 may also include functionality that sends computer data to a computer in the Internet or cloud that performs additional tests. Such additional test may be consistent with tests performed by protection layer 430 that were previously discussed. As such, protection layer 440 may perform software firewall functions that are similar to protections provided by a firewall of protection layer 420. Software functionality consistent with protection layer 440 may be performed when an endpoint computer is contained within a secure network when three different protection layer (420, 430, and 440) each operate to prevent malware from attacking or infecting computing devices. Alternatively, when an endpoint computer is not located within a protected network, functionality consistent with layer 440 or consistent with both layer 440 and 430 may be performed.

As attacks may be identified from information received from malware agents at various locations, malware threats 450, 460, and 470 may be illustrated as being stopped by or passing through a protection layer/shell not only as shown in FIG. 4 but in the context of a methodology like that disclosed in FIG. 2. As previously mentioned threat 450 is stopped by protection layer 420, thread 460 is stopped by protection layer 430, and threat 470 is stopped by protection layer 470. Illustrations consistent with FIG. 4 may be generated in real-time or in near-real-time as threat data is collected by monitoring computers (e.g. anti-malware evaluation system 160 of FIG. 1) over time. Such illustrations may be dynamic and may show threats 450, 460, and 470 moving toward and through or toward a protection both locally and globally as a result of evaluation like that of FIG. 2.

Method and apparatus consistent with the present disclosure may be used to identify that a certain type of threat is targeting one or more particular computer networks. In an instance when the first protection layer 420 is observed as currently not stopping a particular type or instance of malware, yet the second layer 430 is observed as currently stopping that particular type or instance of malware, functionality at protection layer 420 may be updated to include tests or data that allow protection layer 420 to identify this particular type or instance of malware. In such an instance a processor executing instructions of tests performed by protection layer 430 may identify that DPI signature data should be provided to firewalls executing tests performed by protection layer 420.

This processor may then cause these identified DPI signatures to be sent to particular firewalls such that those particular firewalls could identify a particular type or instance of malware. Such an automatic functionality could reduce an amount of work that need be performed at a remote computer at the Internet or cloud by updating anti-malware capabilities at firewall or software firewall dynamically, for example, when a load factor at the remote computer increases to a threshold level. Because of this, analytical tools like the methodology of FIG. 2 and associated with the present disclosure may be used to balance an amount of work performed by computing devices that reside at any protection layer. Furthermore, threat data and generated graphical data may be stored for later reference and this data may be reviewed by intelligent machine processes or by humans when those machines or humans identify patterns associated with the spread of malware.

Figure 5:
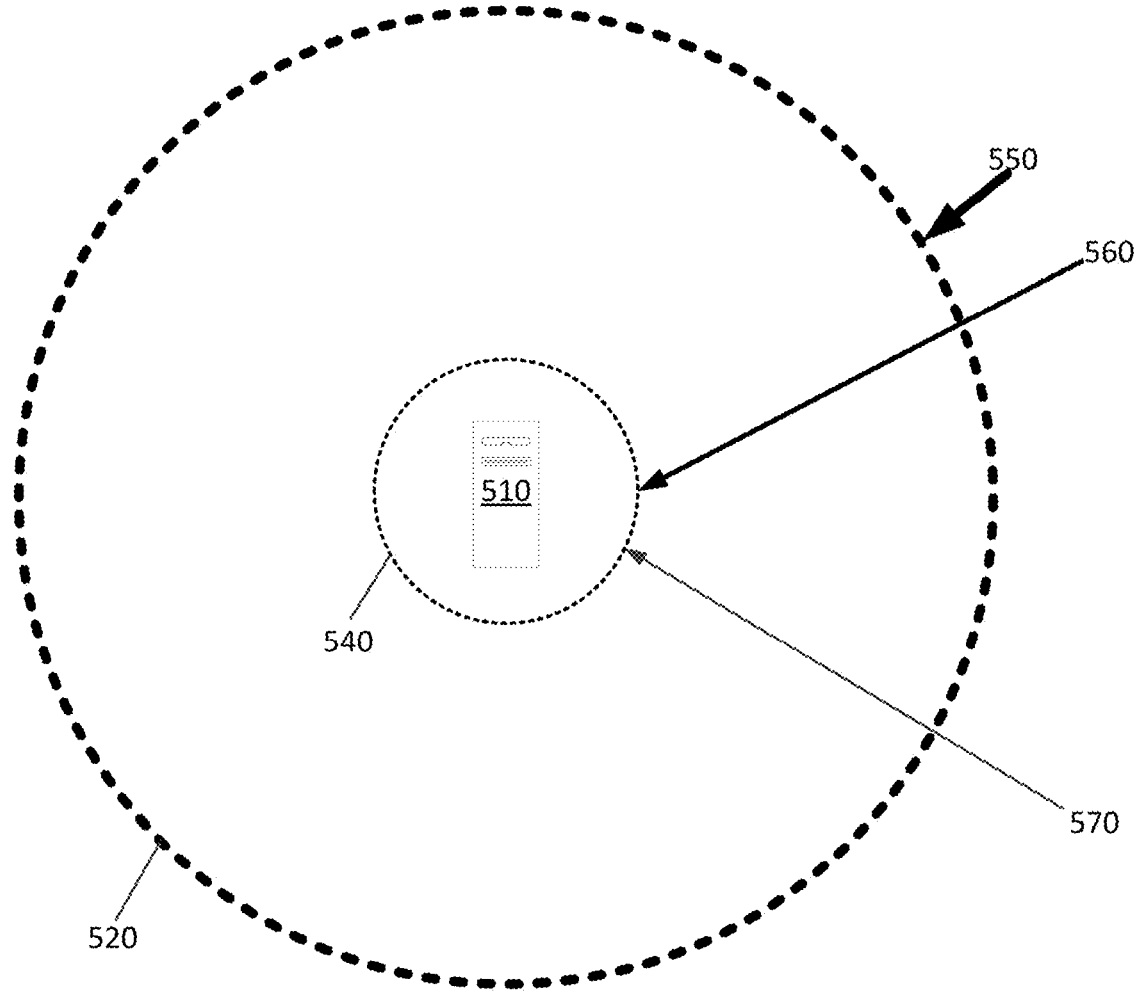
FIG. 5 illustrates a computing device or computer network that is currently protected by two of the three protection layers of FIG. 4.

FIG. 5 illustrates a computing device or computer network that is currently protected by two of the three protection layers of FIG. 4. FIG. 5 includes protection layer 520 that may provide protection consistent with protection layer 430 of FIG. 4 and protection layer 540 that may provide protection consistent with protection layer 440 of FIG. 4. FIG. 5 also includes computer or computer network 510 protected by protection layers 520 and 540. The illustration depicted in FIG. 5 may have been generated using data from anti-malware agents after the second protection layer 430 of FIG. 4 had been disabled (turned off) as discussed in respect to step 250 of FIG. 2.

Tools consistent with evaluating current conditions of the movement of malware through a protection infrastructure may include the ability to turn on or turn off any protection layer when the performances of one or more of a set of protection layers are evaluated. Such an analysis tools may be used to improve the operation of a multi-layer protection system by optimizing which layer should perform one or more types of tests versus another protection layer. Tools consistent with the present disclosure may include a user interface from which settings or conditions may be entered or identified. One of these settings or conditions may cause the functionality of a protection level to be disabled. The disabling or enabling of a particular protection layer test capabilities may be performed by an authorized user entering information into a user interface. A particular protection layer may be disabled at one or more specific networks or protection layers may be disabled throughout an area according to user input.

Data analysis methods consistent with the present disclosure may be used to generate and display visual representations of in real-time or near-real-time threat data that could not otherwise be interpreted by people. Visualizations may be generated that show the movement of malware across the entire World as that malware spreads. Visualizations consistent with the present disclosure may allow users to view the movement of malware through a region or may allow users to identify what types or variants of malware are currently attacking particular individual networks. For example visualizations may depict the movement of malware in a map of the entire World, such as the map illustrated in FIG. 3. Visualizations may identify malware attacks that are occurring in a particular region (country, state, or municipality), or may illustrate malware attacking a particular network, such as a local area network (LAN) or wide area network (WAN) of a particular company. As such, a user interface may receive inputs that identify a particular region or a particular network and that cause a visualization to display malware information according to those user inputs.

When methods or apparatus consistent with the present disclosure identify that variants of a particular type of malware are currently being deployed, anti-malware protection tests at certain levels of a multi-level anti-malware system may not be able to identify each and every variant form of a particular type of malware. In such instances, a number of remote computers located within a region may be increased to keep up with increased demands for being able to identify a new malware variant.

For example, a variant of a first malware instance may be easily identified using DPI when a second variant of the first malware instance would evade detection by DPI inspection. This can occur, when a virus is packaged within different types of computer data or when executable code of a virus is encrypted or hidden by code that causes the virus to be unpacked from other computer data. In instances when many variants of a particular type or instance of malware are propagating through computer networks, an increase in an amount of work required to identify these threats may be required. When a workload at a particular computing device increases to or beyond a threshold level, additional computers capable of performing tests may be directed to analyzing computer data for potential threats.

Figure 6:
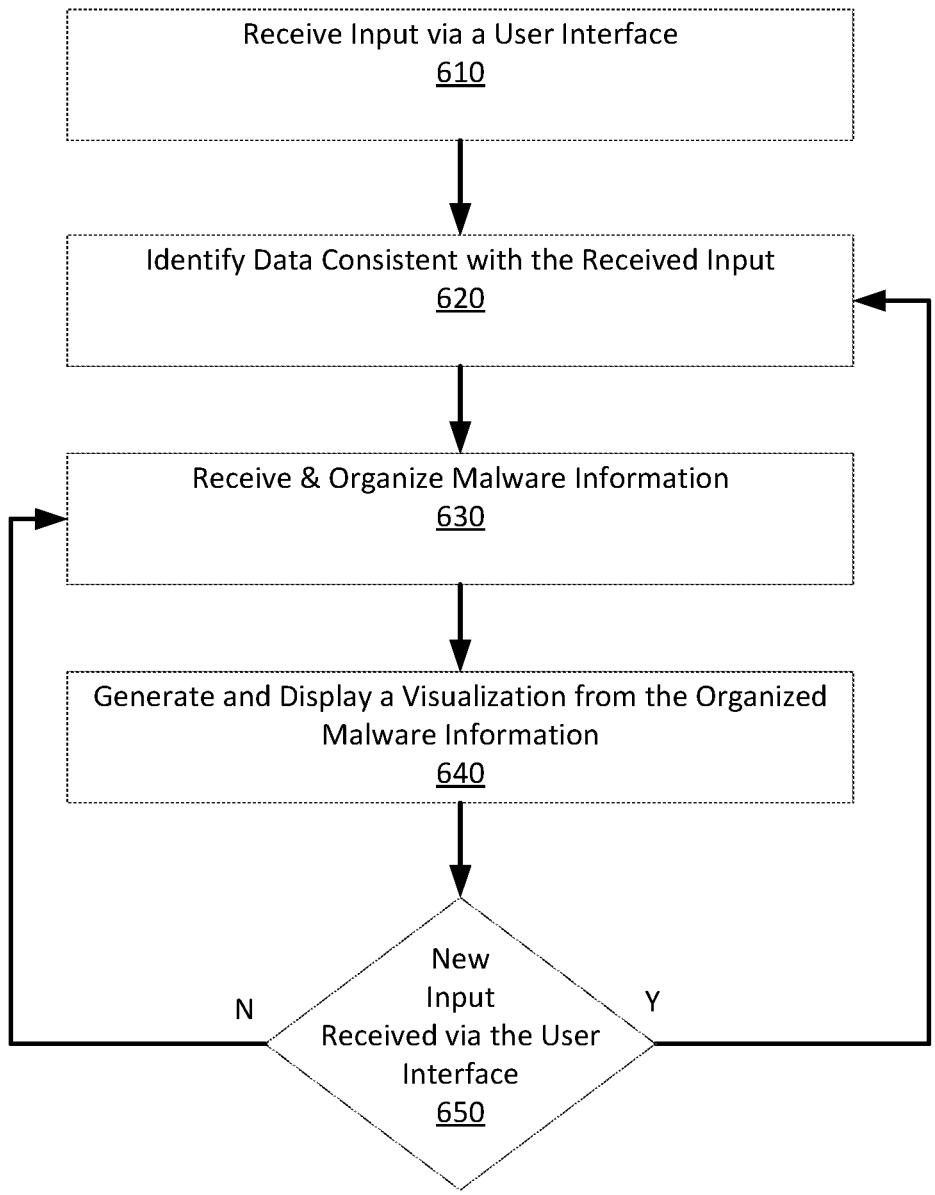
FIG. 6 illustrates various different steps that may be performed by methods or apparatus consistent with the present disclosure as a user interacts with a user interface consistent with the present disclosure.

FIG. 6 illustrates various different steps that may be performed by methods or apparatus consistent with the present disclosure as a user interacts with a user interface consistent with the present disclosure. FIG. 6 begins with step 610 where an input may be received via a user interface. The input received in step 610 of FIG. 6 could identify a region (the World, a country, a state, a city) or could identify a particular network, sub-net, or computing device. When a user input identifies a particular network, that network could be associated with a network that the user is chartered to support. For example, an administrator of a network associated with company ABC could enter a selection that results in visualizations being generated that identify malware threats that are currently affecting the computer network of company ABC.

Next step 620 may identify data that is consistent with a received input and then malware data or information may be received and organized in step 630 of FIG. The data received and organized in step 630 may be data consistent with the input received in step 610. For example, a user may have selected to view malware activity currently impacting computers in New York State or at government organizations in Washington D.C. and malware data associated with a selection may be used to generate and display a visualization of malware information in step 640 of FIG. 6. Visualizations generated in step 640 of FIG. 6 may be consistent with the visualizations illustrated in FIG. 3, 4, or 5 of this disclosure.

Here again, these visualizations may use various colors or line weights when illustrating the spread of different types or instances of malware. After step 640 program flow moves to determination step 650 that identifies whether a new input has been received via the user interface. When step 640 identifies that no new input has been received via the user interface, program flow may move back to step 630 where data is received and organized according to a current set of selections or inputs, after which an updated visualization can be generated and displayed in step 640. When determination step 650 identifies that a new input has been received via the user interface, program flow may move back to step 620, where data consistent with the newly received input may be identified. A change in an input or selections received via the user interface may cause malware data associated with a different area or with a different particular network to be organized and displayed in a generated visualization.

Data sent through networks of any kind may be analyzed for malware threats. Such networks may include cellular networks, networks associated with access or email providers, corporate data networks, or home data networks. In certain instances, malware threat data may identify a type of communication that is currently spreading a form of malware. For example, email or data sent via a particular cellular provider may be identified as a currently critical threat vector. Such determinations may result in warning message being sent to user devices that identify that a certain type of malware is spreading and these messages may be used to warn users not to open certain attachments.

Figure 7:
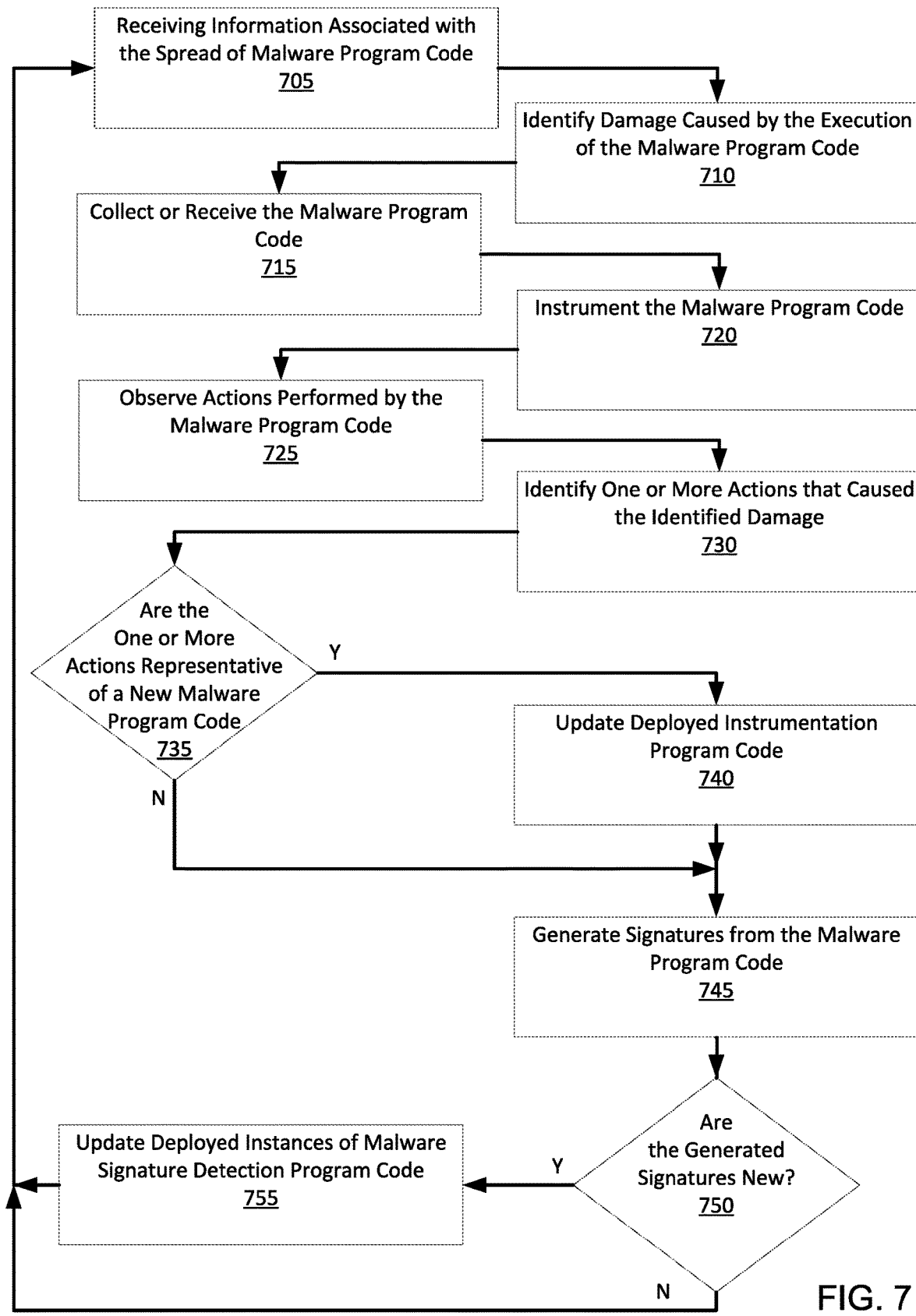
FIG. 7 illustrates a series of steps that may be performed by method or apparatus consistent with the present disclosure that identifies how a set of program code negatively affected computers at a computer network.

FIG. 7 illustrates a series of steps that may be performed by method or apparatus consistent with the present disclosure that identifies how a set of program code negatively affected computers at a computer network. FIG. 7 begins step 705 where information associated with the spread of program code is received. This received information may be associated with a forensic analysis performed after computers at a computer network have been affected by a set of malware program code. Such a forensic analysis could include evaluating email stored on an email server, performing a scan of data at an affected computer, or receiving information from users that were operating computers prior to the malware program code affecting the computer network. For example, as data is received through a process such as deep packet inspection or through a quarantine or capture based process.

After step 705, step 710 of FIG. 7 may identify damage caused by the execution of the malware program code. Damage performed by a set of malware program code may be consistent with an attack that causes new emails to be spawned after a user opens an email or an email attachment. In the event of such an attack, there may be a spike in a number of emails with a certain subject line or a certain email attachment or other embedded code or processes.

In other instances, a scan of the file system or other data stored on at an affected computer system may identify that certain file system attributes, registry settings, boot information, or other data stored at a computer has been altered or damaged. Such determinations may be identified by comparing known good file system data, registry settings, boot information, or other data to data retrieved from a computer infected with a set of malware program code.

In yet other instances, comments may be collected from computer users that were affected by the malware. In such instances, users may provide information via a graphical user interface that identifies actions that they performed before their computer began operating in an unusual way. Answers to such questions may identify that a certain file was opened or that the user selected a universal resource locator (URL) before their computer issue began.

After step 710 a set of malware program code may be collected or received from one or more computers affected by the malware program code in step 715. The set of malware program code may have been identified based on the information collected in step 705 and step 710 of FIG. 7. While steps 705 and 710 may (but are not required to) be steps that include some degree of human participation, the remaining steps of FIG. 7 may be performed without human participation. Alternatively, administrators could be involved with steps of FIG. 7 that occur after step 710. As such, steps 715 through 755 of FIG. 7 may be performed by one or more computing devices with or without the participation of a system administrator, but with said administrator operating and acting in conjunction of a computing device. In such instances, some of the steps of FIG. 7 may be performed by or in conjunction with a computer that performs functions consistent with a sandbox, capture, or quarantine computer.

After the set of malware program code has been received by a computer in step 715 that received program code may be instrumented with instrumentation code in step 720 of FIG. 7. This instrumentation program code may allow a processor to monitors actions performed by the set of malware program code when that malware code is executed by the processor of a recipient computer or firewall or another processor at the sandbox, capture, or quarantine computer. The processor executing the instrumentation code may then observe actions performed when the malware program code is executed in step 725 and one or more actions that caused the identified damage may be identified in step 730 of FIG. 7.

After step 730, program flow may move to determination step 735 that identifies whether the one or more actions identified in step 730 are representative of a new instance or type of malware program code—such as a zero day attack. A new instance of malware program code may perform malicious acts not previously observed or characterized. The identification of a set of malware that has not previously been observed or characterized is significant because sandbox, capture, or quarantine computers that review computer network traffic may not be able to identify a new type of malicious act. This may occur when a malicious action was never previously observed or when that malicious act was never considered as a type of action that should be identified as malicious.

When determination step 735 identifies that a set of program code is new, program flow may move to step 740 where the functionality of sandbox, capture, or quarantine computers deployed to inspect computer network traffic may be updated. In such instances, these updates may include sending data to sandbox, capture, and quarantine computers located throughout the World such that these sandbox, capture, and quarantine computers will be configured to identify newly characterized malicious actions.

Either after step 740 or when determination step 735 identifies that the one or more actions performed in step 730 are not new malware actions, program flow may move to step 745 of FIG. 7. Step 745 may then generate signatures from this new set of malware. In certain instances, the signatures generated in step 745 may be new previously unobserved signatures or the signatures generated in step 745 may not be new. It may be possible for a new set of malware program code to include data that matches a previously identified signature as the new set of malware code may be configured to perform previously uncharacterized actions where portions of that code include data that are consistent with older signatures. In other instances, newly generated signatures indicative of malicious code may be also be new.

After step 745, determination step 750 may identify whether the signatures generated in step 745 are new, when no program flow may move back to step 705. When determination step 750 identifies that the signatures generated in step 745 are new malware signatures, deployed instances of signature detection program code may be updated at step 755. These deployed instances of signature detection program code could include instructions that execute at firewalls that protect computers at a personal network or at a corporate intranet. These firewalls may execute signature detection program code when analyzing computer data received from the Internet. These firewalls may be configured to perform deep packet inspection (DPI) scanning of received computer data (e.g. email, files, data accessed via a link/URL, or other data). These updates may ultimately be streamed and updated in real time as generated from a central server or series of central servers, available for download, or simply providing a new profile, hash, or identifier reflecting the presence of the malicious attack and activity related thereto The steps performed in FIG. 7 may have been performed after a computer network of an entity has been successfully attacked by a set of malicious program code at a time when that entity did not have adequate infrastructure to identify that particular set of malicious program code. Such an attack may have occurred at a time when companies deployed resources to detect this particular set of malware code. For example, assume that a computer network belonging to company ABC was using anti-virus software made by anti-virus company XYZ, whose products did not detect the malware that successfully attacked company ABC's computer network.

After the products of company XYZ failed to detect this malware, company ABC may have hired an analytics company to evaluate how their network could have been protected from the malware that damaged their network. As such, resources owned and operated by an analytics company may perform the steps of FIG. 7. After the steps of FIG. 7 have been performed, company ABC may contract with the analytics company to purchase improved anti-malware products and services.

In other instances, a new set of malware code could damage a computer network because the new set of malware code was never observed before. Regardless as to whether a set of malware code is new to a particular company or is truly a new form of previously uncharacterized malware, the steps of FIG. 7 may be used to enhance anti-malware products and services after a successful attack. The steps of FIG. 7 may, thus, be used to motivate entities to change products that they use to protect their network, may be used by companies to market their anti-malware products and services, or may be used by anti-malware companies to identify new types of threats.

Figure 8:
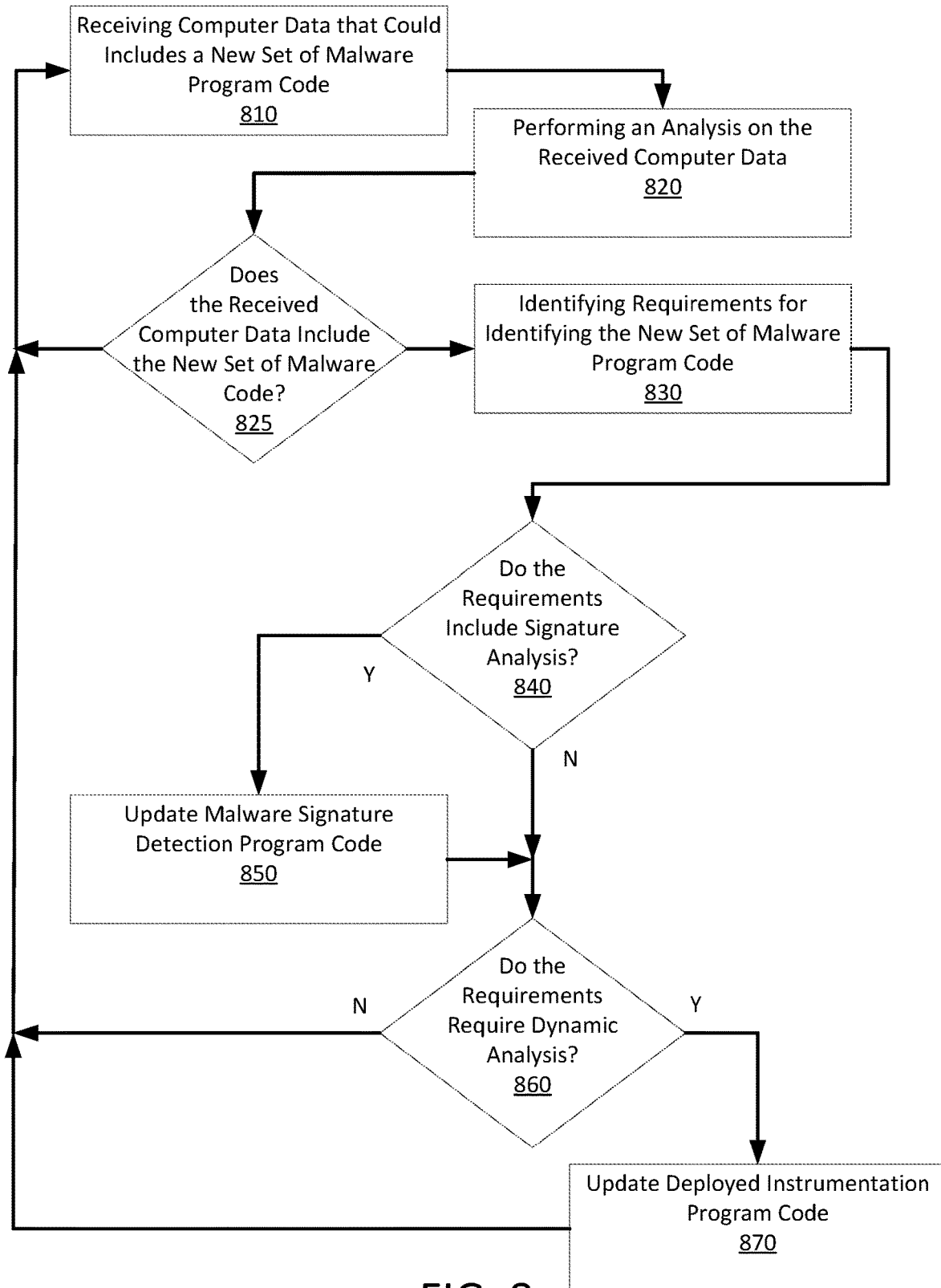
FIG. 8 illustrates a series of steps that may identify locations were anti-malware assets should be deployed as new malware is discovered and characterized.

FIG. 8 illustrates a series of steps that may identify locations were anti-malware assets should be deployed as new malware is discovered and characterized. FIG. 8 begins with step 810 where computer data that may include a new set of malware program code is received. Next in step 820, the received set of computer data is analyzed to see if it contains a previously uncharacterized set of malware program code. The Analysis performed in step 820 may include allowing instructions in the received computer data to execute in a secure environment of a sandbox computer system. This analysis may include running instrumentation code that allows a processor to observe actions performed when instructions included in the received set of program code are executed by the processor or by another processor at the sandbox computer. Determination step 825 may then identify whether the received computer data includes a new set of previously uncharacterized malware. A new set of previously uncharacterized malware may include instructions that have never been observed before or may include a set of instructions that were previously characterized, yet are obfuscated in a new way. An example of previously characterized malicious program code is a set of data that includes instructions that are obfuscated in a new way. As such, a set of computer data may be classified as a new set of malware when that set of computer data includes previously characterized malicious code when that malicious code is hidden in a new way.

When determination step 825 identifies that the received computer data does not include a new set of malware code, then program flow may move back to step 810. When determination step 825 identifies that the received computer data includes a new set of malware code, program flow may move to step 830 where requirements for identifying this new set of malware program code are identified. After step 830, determination step 840 may identify whether these new requirements include a signature analysis. This determination may be made by generating a signature from instructions included in a set of computer data that are known to result in a malicious action. When determination step 840 identifies that the new set of malware can be identified by one or more new signatures, program flow may move to step 850 where new signatures are sent to computers that test computer data for the presence of malware by generating and comparing signatures.

For example, an analysis computer may send a new signature to a firewall and when that firewall receives an email, the firewall may generate a signature from data included in that email, and then that firewall may identify that the data included in the email includes malicious program code when the signature generated by the firewall matches the new signature. As such, methods and apparatus consistent with the present disclosure allow firewalls to identify the new malware program code using the newly identified malware signatures. In certain instances, computers, mobile devices (e.g. cell phones or tablet computers) could also be provided these newly identified malware signatures such that malware signature detection program code at these devices could detect this new malware using signature analysis.

When determination step 840 identifies that the requirements for identifying the new set of malware program code do not include signature analysis or after step 850, program flow may move to determination step 860. Determination step 860 may then identify whether the requirements for identifying the new set of malware program code include dynamic analysis. This dynamic analysis may include executing instructions at a sandbox computer that monitors execution of received program code using instrumentation code. Determination step 860 may identify that dynamic analysis is not required to identify the new set of malware code because that code should be identifiable using signature analysis alone. As such, program flow may move from step 860 to step 810 when a processor identifies that the requirements for identifying the new set of malware program code do not require dynamic analysis. When determination step 860 identifies that the requirements for identifying the new set of malware program code require dynamic analysis, program flow moves from step 860 to step 870 where deployed sets of instrumentation program code may be updated with information that a sandbox computer can use to detect the malware. After step 870 program flow may move back to step 810 of FIG. 8. As reviewed above, the steps included in FIG. 8 may result in identifying and characterizing computer data that includes new sets of malicious program code. Computers that perform this analysis may also update data stored at computers that perform deep packet inspection (DPI), signature analysis, or that perform dynamic analysis.

Figure 9:
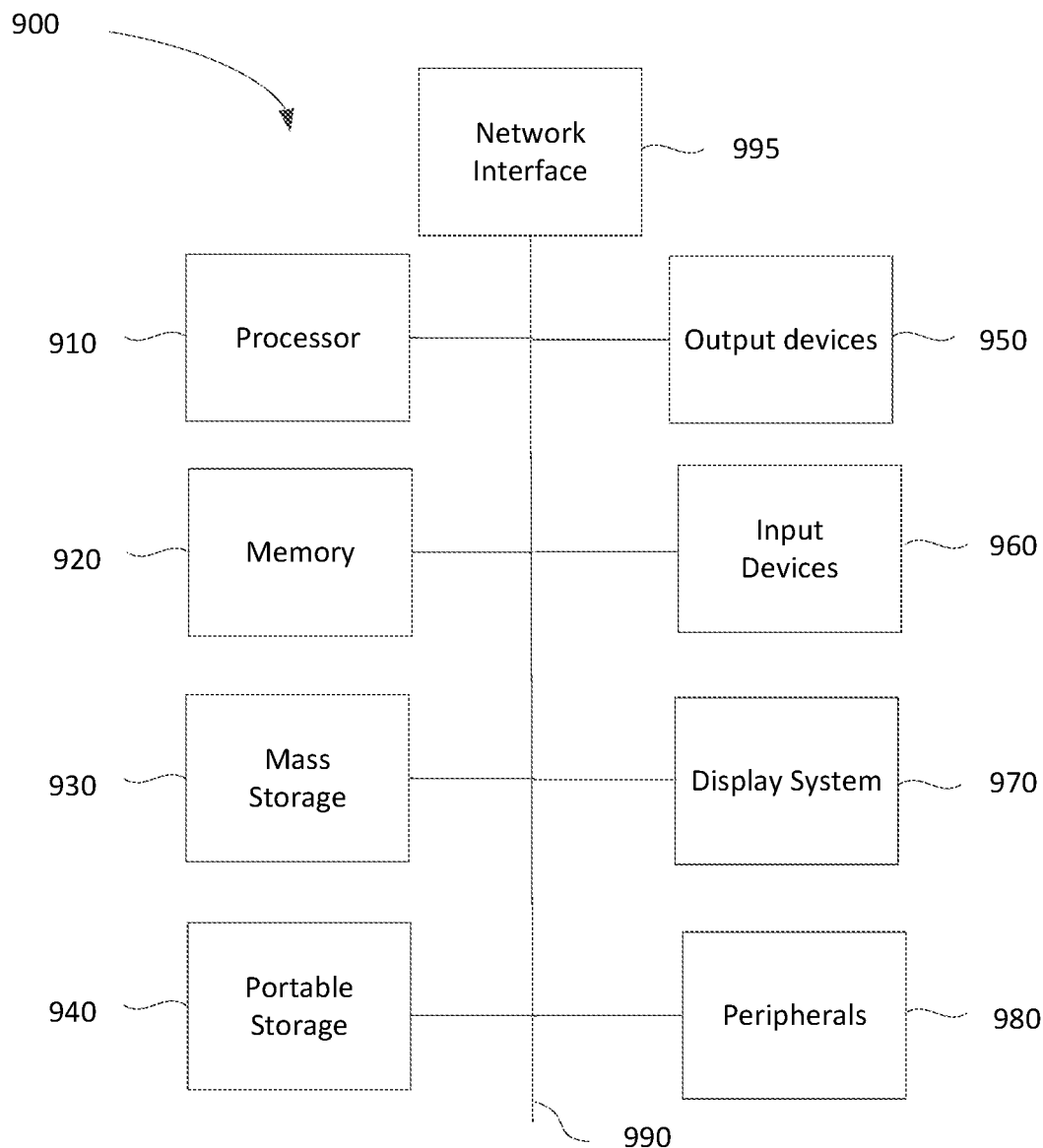
FIG. 9 illustrates a computing system that may be used to implement an embodiment of the present invention.

FIG. 9 illustrates a computing system that may be used to implement an embodiment of the present invention. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, peripheral devices 980, and network interface 995.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a FLASH memory, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), a plasma display, an organic light-emitting diode (OLED) display, an electronic ink display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem or a router.

Network interface 995 may include any form of computer interface of a computer, whether that be a wired network or a wireless interface. As such, network interface 995 may be an Ethernet network interface, a BlueTooth™ wireless interface, an 802.11 interface, or a cellular phone interface.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 900 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for tracking spread of malware, the method comprising:
   receiving malware test data collected from a plurality of computing devices over a communication network;
   identifying at least one location of at least one of the computing devices as an originating source of the malware test data, wherein the at least one location is identified as being affected by malware indicated by the malware test data;
   determining a response to the malware affecting the at least one location based on a type of the malware, wherein the response comprises a set of instructions including:
      a first adjustment of a first computing device of the plurality of computing devices, and
      a second adjustment of a second computing device of the plurality of computing devices, wherein each of the first and second adjustments are configured to prevent further spread of the malware to additional locations of the plurality of computing devices,
   wherein determining the response includes:
   identifying a number of malicious incidents detected in the malware test data associated with a location of each of the plurality of computing devices;
   identifying a set of one or more of the computing devices in one or more locations of a private network affected by at least one of the malicious incidents, wherein the first adjustment or the second adjustment is based on the locations of the identified set of the computing devices and the malware test data collected at each of the locations; and
   generating a visualization that illustrates the first and second adjustments and the prevention of the malware from spreading to the additional locations.

2. The method of claim 1, wherein the at least one location includes one or more of a map location and a network location of the type of malware, and wherein determining the response is further based on the one or more of the map location and the network location.

3. The method of claim 1, further comprising:
   identifying an anti-malware agent to deactivate; and
   identifying one or more condition changes to the malware test data caused by the deactivation of the anti-malware agent.

4. The method of claim 3, further comprising:
   deactivating one or more different anti-malware agents including the identified anti-malware agent in iteration;
   monitoring the identified condition changes to the malware test data; and
   determining one or more strengths or weaknesses associated with the computing devices that provide the malware test data.

5. The method of claim 1, wherein determining the response further includes identifying at least one source of the malware detected in the malware test data, wherein the at least one source is disabled, and further comprising:
   generating a signature for identifying a set of malware program code associated with the malware, wherein the signature includes one or more of an identification of the malware, a set of malicious actions related to the malware, and one or more remedial actions to prevent the malware from effecting the computing device; and
   distributing the signature to the plurality of computing devices.

6. The method of claim 1, wherein the visualization includes visual indicators of map locations of the malware and associated malware vectors indicating paths of transmission of the malware.

7. A non-transitory computer readable storage medium having embodied thereon a program executable by a processor to implement a method for tracking spread of malware, the method comprising:
   receiving malware test data collected from a plurality of computing devices over a communication network;
   identifying at least one location of at least one of the computing devices as an originating source of the malware test data, wherein the at least one location is identified as being affected by malware indicated by the malware test data;
   determining a response to the malware affecting the at least one location based on a type of the malware, wherein the response comprises a set of instructions including:
      a first adjustment of a first computing device of the plurality of computing devices, and
      a second adjustment of a second computing device of the plurality of computing devices, wherein each of the first and second adjustments are configured to prevent further spread of the malware to additional locations of the plurality of computing devices, and
   wherein determining the response includes:
   identifying a number of malicious incidents detected in the malware test data associated with a location of each of the plurality of computing devices;
   identifying a set of one or more of the computing devices in one or more locations of a private network affected by at least one of the malicious incidents, wherein the first adjustment or the second adjustment is based on the locations of the identified set of the computing devices and the malware test data collected at each of the locations; and
   generating a visualization that illustrates the first and second adjustments and the prevention of the malware from spreading to the additional locations.

8. The non-transitory computer readable storage medium of claim 7, wherein the at least one location includes one or more of a map location and a network location of the type of malware, and wherein determining the response is further based on the one or more of the map location and the network location.

9. The non-transitory computer readable storage medium of claim 7, further comprising instructions executable to:
identify an anti-malware agent to deactivate; and
identify one or more condition changes to the malware test data caused by the deactivation of the anti-malware agent.

10. The non-transitory computer readable storage medium of claim 9, further comprising instructions executable to:
deactivate one or more different anti-malware agents including the identified anti-malware agent in iteration;
monitor the identified condition changes to the malware test data; and
determine one or more strengths or weaknesses associated with the computing devices that provide the malware test data.

11. The non-transitory computer readable storage medium of claim 7, wherein determining the response further includes identifying at least one source of the malware detected in the malware test data, wherein the at least one source is disabled, and further comprising instructions executable to:
generate a signature for identifying a set of malware program code associated with the malware, wherein the signature includes one or more of an identification of the malware, a set of malicious actions related to the malware, and one or more remedial actions to prevent the malware from effecting the computing device; and
distribute the signature to the plurality of computing devices.

12. The non-transitory computer readable medium of claim 7, wherein the visualization includes visual indicators of map locations of the malware and associated malware vectors indicating paths of transmission of the malware.

13. A system for tracking spread of malware, the system comprising:
an analysis computer operatively connected to a computer network, the analysis computer configured to:
receive malware test data collected from a plurality of computing devices over a communication network;
identify at least one location of at least one of the computing devices as an originating source of the malware test data, wherein the at least one location is identified as being affected by malware indicated by the malware test data;
determine a response to the malware affecting the at least one location based on a type of the malware, wherein the response comprises a set of instructions including:
a first adjustment of a first computing device of the plurality of computing devices, and
a second adjustment of a second computing device of the plurality of computing devices, wherein each of the first and second adjustments are configured to prevent further spread of the malware to additional locations of the plurality of computing devices, and
wherein the analysis computer determines the response by further:
identifying a number of malicious incidents detected in the malware test data associated with a location of each of the plurality of computing devices; and
identifying a set of one or more of the computing devices in one or more locations of a private network affected by at least one of the malicious incidents, wherein the first adjustment or the second adjustment is based on the locations of the identified set of the computing devices and the malware test data collected at each of the locations; and
generate a visualization that illustrates the first and second adjustments and the prevention of the malware from spreading to the additional locations.

14. The system of claim 13, wherein the at least one location includes one or more of a map location and a network location of the type of malware, and wherein determining the response is further based on the one or more of the map location and the network location.

15. The system of claim 13, wherein the analysis computer is further configured to:
identify an anti-malware agent to deactivate; and
identify one or more condition changes to the malware test data caused by the deactivation of the anti-malware agent.

16. The system of claim 15, wherein the analysis computer is further configured to:
deactivate one or more different anti-malware agents including the identified anti-malware agent in iteration;
monitor the identified condition changes to the malware test data; and
determine one or more strengths or weaknesses associated with the computing devices that provide the malware test data.

17. The system of claim 13, wherein the analysis computer determines the response further by identifying at least one source of the malware detected in the malware test data, wherein the at least one source is disabled, and wherein the analysis computer is further configured to:
generate a signature for identifying a set of malware program code associated with the malware, wherein the signature includes one or more of an identification of the malware, a set of malicious actions related to the malware, and one or more remedial actions to prevent the malware from effecting the computing device; and
distribute the signature to the plurality of computing devices.

18. The system of claim 13, wherein the visualization includes visual indicators of map locations of the malware and associated malware vectors indicating paths of transmission of the malware.

* * * * *